US007098848B2

(12) United States Patent
Ksienski et al.

(10) Patent No.: US 7,098,848 B2
(45) Date of Patent: Aug. 29, 2006

(54) PHASED ARRAY ANTENNA INTERMODULATION SUPPRESSION BEAM SMEARING METHOD

(75) Inventors: David A. Ksienski, Los Angeles, CA (US); Gwendolyn M. Shaw, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 172 days.

(21) Appl. No.: 10/963,877

(22) Filed: Oct. 12, 2004

(65) Prior Publication Data

US 2006/0084378 A1 Apr. 20, 2006

(51) Int. Cl.
*H01Q 3/24* (2006.01)
*H04B 7/14* (2006.01)

(52) U.S. Cl. ...................................... 342/372; 342/373

(58) Field of Classification Search ................ 342/368, 342/371, 372, 373; 455/13.3, 25
See application file for complete search history.

(56) References Cited

U.S. PATENT DOCUMENTS

| | | | | |
|---|---|---|---|---|
| 3,517,389 | A * | 6/1970 | Dausin | 342/371 |
| 4,642,645 | A * | 2/1987 | Haupt | 342/379 |
| 6,009,124 | A * | 12/1999 | Smith et al. | 375/267 |
| 6,246,364 | B1 * | 6/2001 | Rao et al. | 342/368 |
| 2002/0158801 | A1 * | 10/2002 | Crilly et al. | 342/378 |

* cited by examiner

*Primary Examiner*—Dao L. Phan
(74) *Attorney, Agent, or Firm*—Derrick Michael Reid

(57) ABSTRACT

An intermodulation suppression method using phased array antenna electronics insignificantly degrades the desired primary main beams while substantially suppressing undesired intermodulation product beams, and particularly undesired third-ordered intermodulation product beams. The beam smearing method has two aspects, including phase smearing and angle smearing for respective subarrays to reduce the intermodulation-product beams of the phased array antenna beam patterns. With a 1 dB degradation of the primary main beams, a 6 dB to 10 dB suppression of the intermodulation product beams is achieved.

12 Claims, 7 Drawing Sheets

BEAM SMEARING PROCESS

PHASE ARRAY ANTENNA

BEAM SMEARING SYSTEM

FIELD OF VIEW ANTENNA PATTERN

STEERED MAIN BEAM

STEERED 3rd
INTERMODULATION
PRODUCT BEAM

PHASE SMEARED
MAIN BEAM

PHASE SMEARED 3rd
INTERMODULATION
PRODUCT BEAM

ANGLE SMEARED
MAIN BEAM

ANGLE SMEARED 3rd
INTERMODULATION
PRODUCT BEAM

ANGLE AND PHASE
SMEARED MAIN BEAM

ANGLE AND PHASE SMEARED
3rd INTERMODULATION
PRODUCT BEAM $2f_2 - f_1$ QUADRANT BEAM SMEARING $2f_1 - f_2$ QUADRANT BEAM SMEARING

BEAM SMEARING PROCESS

PHASED ARRAY ANTENNA INTERMODULATION SUPPRESSION BEAM SMEARING METHOD

STATEMENT OF GOVERNMENT INTEREST

The invention was made with Government support under contract No. F04701-00-C-0009 by the Department of the Air Force. The Government has certain rights in the invention.

REFERENCE TO RELATED APPLICATION

The present application is related to applicant's copending application entitled Intermodulation Grating Lobe Suppression Method: Ser. No. 09/968,190 filed Oct. 1, 2001.

FIELD OF THE INVENTION

The invention relates to the field of antenna designs, including phased array antenna systems and antenna beam steering systems. More particularly, the present invention relates to phased array antenna systems having elemental phasing producing unwanted intermodulation products.

BACKGROUND OF THE INVENTION

Communication systems use antennas for transmitting and receiving communication signals. The communication systems can use a variety of antenna systems having transmitter and receiver antennas for defining antenna gain patterns with peaks for directional transmitting and receiving the communication signals. One type of antenna system is the active transmit phased arrays having multiple directional antenna elements using beam steering. Typically, the phased array antenna has a plurality of individual antenna elements lying in plane. Each antenna element broadcasts one or more steered communication signals eliminating the need for multiple apertures. Each array element has a respective phase offset for each signal for steering the respective antenna beams in a desired direction toward communication receivers.

Active transmit phased array antenna typically have one main beam using a beam forming design in which all of the elements of phased array antenna are phased to collectively point the main beam in a desired direction. Active phased arrays have solid-state power amplifiers at each array element. These solid-state power amplifiers are nonlinear devices that produce the unwanted intermodulation products when multiple signals are introduced and communicated. The intermodulation frequencies are spaced according to the difference between the frequencies. For example, when two transmit carrier frequencies $f_1$ and $f_2$ are used for broadcasting signals with two primary main beams, then the unwanted intermodulation product frequencies are $2f_1-f_2$ and $2f_2-f_1$. The phased array produces antenna patterns at the intermodulation frequencies. The secondary intermodulation main beams of the intermodulation product patterns are steered according to the difference in the pointing angles of the primary main beams. Therefore, the phased array antenna field of view contains the two primary main beams and may contain intermodulation grating lobe beams depending on the difference in pointing angles of the two primary main beam patterns. When the primary main beams are closely spaced, then the secondary intermodulation main beams and intermodulation grating lobe beam may disadvantageously appear within the field of view of the phased array antenna. When the primary main beams are widely spaced, then a special condition occurs where the secondary intermodulation main beams advantageously appear outside the field of view and the intermodulation grating lobe beams disadvantageously appear within the field of view. When the intermodulation grating lobe beams are in the field of view, then the intermodulation grating lobe beams are unwanted interference generated at the intermodulation frequencies. In theory, the beam forming design can be modified to accommodate two or more main beams. However, the transmission of the multiple communication signals create unwanted intermodulation products in power amplifiers that produce gain patterns appearing as unwanted signals at intermodulation frequencies in secondary intermodulation main beams and grating lobes in the antenna gain pattern. As a practical consideration, extensive design modifications are necessary to produce two or more beams with an active transmit phased array antenna. For example, phased array antennas having a plurality of main beams and operating at a plurality of different frequencies for transmitting a plurality of different signals produce intermodulation products as unwanted intermodulation beams typically because solid-state power amplifiers at each array element produce intermodulation products when multiple signals are transmitted or received.

Primary techniques for reducing intermodulation products include backing off the output amplifier from a highest level, and linearization of the output high power amplifier. For example, a 1 dB power backoff of the amplifier would yield a 3 dB suppression of the intermodulation product. Power backoff reduces the amplifier power efficiency and has limited effectiveness, and amplifier linearization requires costly complexity in the antenna design. Transmitter power amplifier linearizers and power back-off methods are used to reduce signal distortion. While solid-state power amplifier linearizers and power back-off techniques can lower the levels of the unwanted intermodulation products, such techniques lower the array efficiency. The phased arrays have intermodulation products that produce unwanted beams because solid-state power amplifiers at each array element produce intermodulation products when multiple signals are introduced. Primary methods for reducing intermodulation products are amplifier output-power-backoff and amplifier linearization. Power backoff reduces the amplifier power efficiency and has limited effectiveness, and amplifier linearization requires costly development work.

Hence, it is desirable to control the phased array elements with grating lobe suppression for reduced signal distortion during signal transmission that may use saturated power amplifiers and linearization methods. It is desirable to use a phasing method that reduces unwanted intermodulation products in addition to linearization methods. However, an improved phasing method should be independent of nonlinear high power amplifiers or solid-state power amplifiers. In a subarray separation approach, the phased array antenna elements are first divided into equal subarrays and then each subarray is separated by uniform spacing from each other so as to reduce intermodulation products. By physically partitioning the array into subarrays of antenna array elements and then physically separating the subarrays, unwanted grating lobes in the field of view were suppressed. The subarray separation approach disadvantageously only suppresses intermodulation grating lobe beams and does not suppress all undesirable intermodulation product beams, for example, the intermodulation main beams. These and other disadvantages are solved or reduced using the invention.

SUMMARY OF THE INVENTION

An object of the invention is to provide a method for suppressing intermodulation product beams in a phased array antenna system.

Another object of the invention is to provide a method for suppressing intermodulation product beams by beam smearing in a phased array antenna system having equally spaced antenna elements.

Another object of the invention is to provide a method for suppressing intermodulation product beams in a phased array antenna system by phase smearing the phases of signals communicated through phased array antenna elements.

Yet another object of the invention is to provide a method for suppressing intermodulation product beams in a phased array antenna system by angle smearing the phases of signals communicated through phased array antenna elements.

Still another object of the invention is to provide a method for suppressing intermodulation product beams in a phased array antenna system by angle smearing the phases of signals by gradient phasing the signals communicated through phased array antenna elements in each respective subarray.

A further object of the invention is to provide a method for suppressing intermodulation product beams in a phased array antenna system by phase smearing the phases of signals by uniform phasing the signals communicated through phased array antenna elements in each respective subarray.

Still another object of the invention is to provide a method for suppressing intermodulation product beams in a phased array antenna system by angle smearing the phases of signals modulating respective carrier frequencies by gradient phasing the signals communicated through phased array antenna elements in each respective subarray.

Yet a further object of the invention is to provide a method for suppressing intermodulation product beams in a phased array antenna system by phase smearing the phases of signals modulating respective carrier frequencies by uniform phasing the signals communicated through phased array antenna elements in each respective subarray.

The present invention is directed to a beam smearing method for intermodulation suppression in a phased array antenna system having uniform element spacing. This method includes the components phase smearing and angle smearing collectively referred to as beam smearing. The beam smearing includes angle smearing using gradient phasing and phase smearing using uniform phasing of the communicated signals modulating respective carrier frequencies $f_1$ and $f_2$. In the preferred form, the antenna beam includes two primary main beams and two intermodulation product beams. Conventional beam steering is by gradient phase shifts across the entire phased array antenna. The method insignificantly degrades the desired main beams at $f_1$ and $f_2$ a small amount while significantly suppressing the intermodulation product beams at $2f_1-f_2$ and $2f_2-f_1$. Beam smearing includes phase smearing by uniform phase shifts through subarray elements and includes angle smearing by gradient phase shifts. That is, the beam smearing method reduces third-order intermodulation products $2f_1-f_2$ and $2f_2-f_1$ with minor degradation of the desired main beams $f_1$ and $f_2$. The beam smearing method provides increased intermodulation beam suppression at the cost of a minor degradation of the desired main beams that can be advantageously retrofitted into existing phased array antenna systems. These and other advantages will become more apparent from the following detailed description of the preferred embodiment.

DETAILED DESCRIPTION OF THE PREFERRED EMBODIMENT

Figure 1:
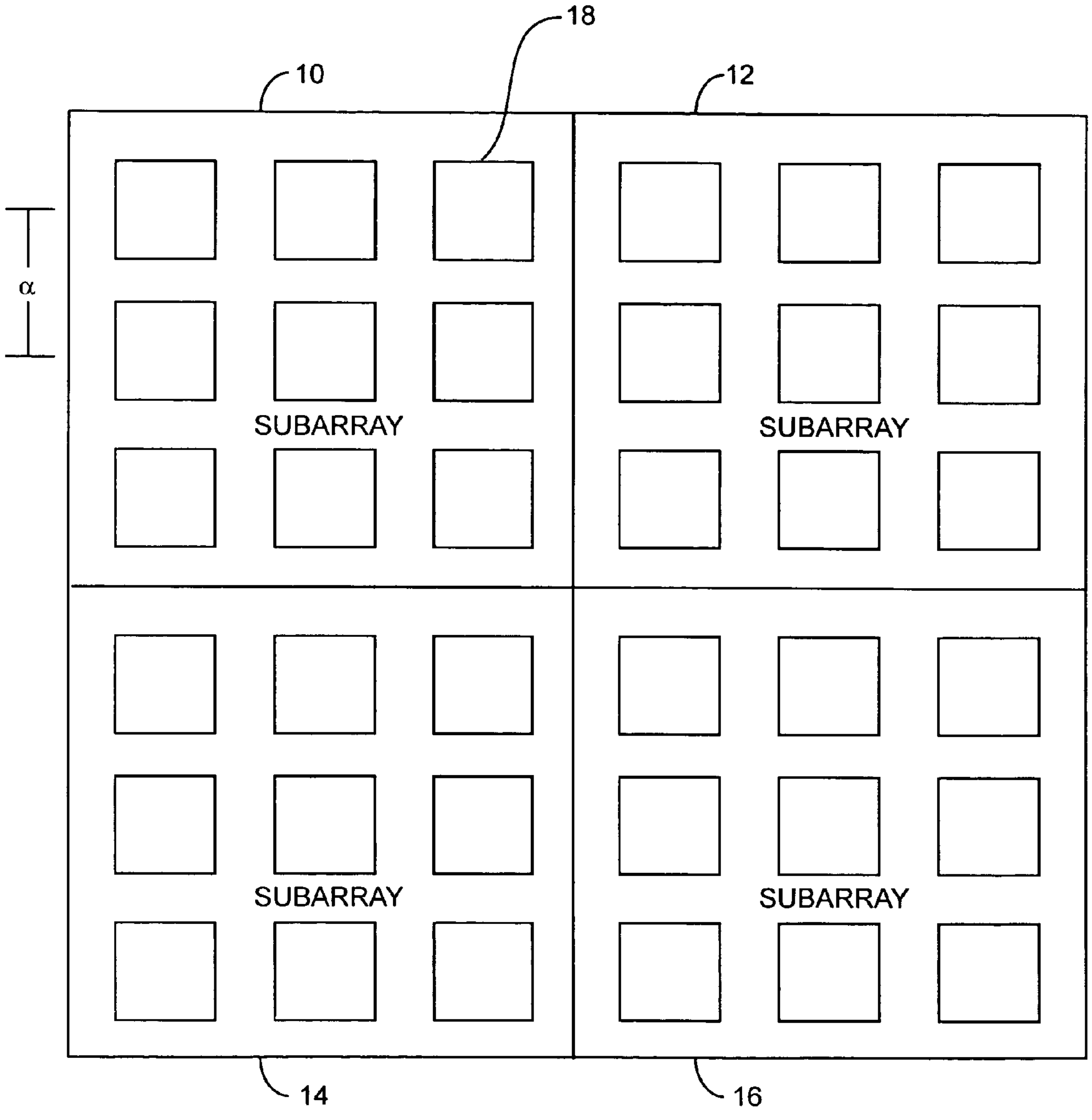
FIG. 1 is a diagram of a subarray divided phased array antenna.

An embodiment of the invention is described with reference to the figures using reference designations as shown in the figures. The intermodulation suppression beam smearing method for use in a phased array antenna system includes a phased array antenna and a beam smearing system. Referring to FIG. 1, a subarray divided phased array antenna is divided into subarrays such as subarray 10, subarray 12, subarray 14 and subarray 16. Each of the subarrays 10, 12, 14, and 16 include an equal number of antenna elements, such as nine antenna elements one of which is shown as antenna element 18 in subarray 10. The phased array of antenna elements can be a conventional phased array antenna having equally spaced antenna elements about the entire phased array antenna. In the exemplar preferred form, the entire antenna array is divided into four subarrays, which are called array quadrants. For simplicity, the phased array antenna is shown to have thirty-six elements that are divided into four subarrays or array quadrants through controlled operations.

Figure 2:
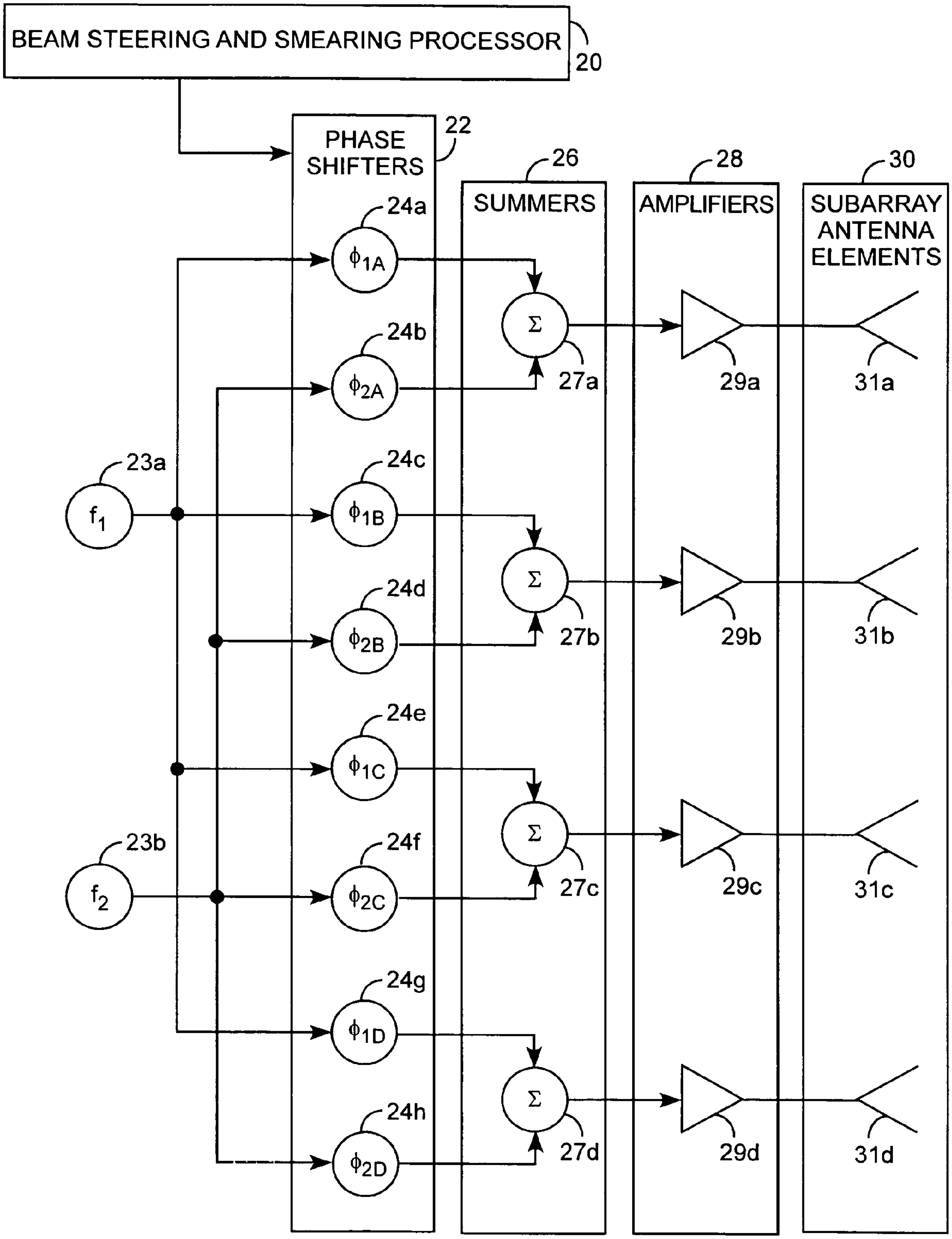
FIG. 2 is a schematic of a beam smearing system.

Referring to FIGS. 1 and 2, and more particularly to FIG. 2, the phased array antenna is controlled by a beam smearing system. A beam steering and smearing processor 20 communicates elemental phases for each subarray 10, 12, 14, and 16 to a series of phase shifters 22. Two communicated signals 23*a* and 23*b* having respective carriers frequencies at $f_1$ and $f_2$. The phase shifter 22 includes eight individual phase shifters 24*a*, 24*b*, 24*c*, 24*d*, 24*e*, 24*f*, 24*g*, and 24*h*. In the preferred form, the signal 23*a* at carrier frequency f1 is communicated to phase shifter 24*a* having a phase shift of $\phi$1A, to phase shifter 24*c* having a phase shift of $\phi$1B, to phase shifter 24*e* having a phase shift of $\phi$1C, and to phase shifter 24*g* having a phase shift of $\phi$1D, while, the signal 23*b* at carrier frequency f2 is communicated to phase shifter 24*b* having a phase shift of $\phi$2A, to phase shifter 24*d* having a phase shift of $\phi$2B, to phase shifter 24*e* having a phase shift of $\phi$1C, and to phase shifter 24*g* having a phasing phase shift of $\phi$1D. The phased shifted communicated signals from the phase shifters 24*a* through 24*h* communicate the phase shifted signals at f1 and f2 to summers 26 including summers 27*a*, 27*b*, 27*c*, and 27*d*.

The f1 and f2 signals are respectively phased shifted by phase shifters $\phi$1A and $\phi$2A and summed by summer 27*a* for providing a first summed signal, are respectively phased shifted by phase shifters $\phi$1B and $\phi$2B and summed by summer 27*b* for providing a second summed signal, are respectively phased shifted by phase shifters $\phi$1C and $\phi$2C and summed by summer 27*c* for providing a third summed signal, and are respectively phased shifted by phase shifters $\phi$1D and $\phi$2D and summed by summer 27*d* for providing a fourth summed signal. The first, second, third, and fourth summed signals are amplified by amplifiers 28 including amplifier 29*a* for amplifying the first summed signals, including amplifier 29*b* for amplifying the second summed signals, including amplifier 29*c* for amplifying the third summed signals, and including amplifier 29*d* for amplifying the fourth summed signals to respectively provide a first amplified signal, a second amplified signal, a third amplified signal, and a fourth amplified signal. The first amplified signal, second amplified signal, third amplified signal, and fourth amplified signal are communicated to subarray antenna elements 30 including antenna elements 31*a*, 31*b*, 31*c*, and 31*d*. The first amplified signal, second amplified signal, third amplified signal, and fourth amplified signal are respectively communicated to subarray antenna elements 30 including antenna elements 31*a*, 31*b*, 31*c*, and 31*d*. Identical phases shifters 22, summers 26, amplifiers 28 and subarray antenna elements 30 are used for each of the subarrays 10, 12, 14, and 16. For each subarray the beam steering and smearing processor 20 provides an antenna-wide gradient phase for beam steering as is conventional practice, provides subarray gradient phase for each of the subarrays graduated over the subarray antenna elements for angle smearing, and provides a subarray uniform phase for each of the subarrays uniform over the subarray antenna elements phase smearing. For angle smearing, the phase shift for each element in a subarray is graduated to provide a gradient phase shift across the subarray. Each subarray has a different phase gradient. For phase smearing, the phase shift for each element in a subarray is equal and hence is a uniform phase across the subarray. Each subarray may have a different uniform phase shift.

The subarrays provide respective subarray beams that combine to form the antenna beam including the two primary main beams and the intermodulation product beams. The total phase shifts of the carrier frequencies communicated through the respective antenna elements include a gradient phase shift over the entire array for antenna beam steering, a uniform phase shift over each respective subarray for phase smearing, and a gradient phase shift over each respective subarray for angle smearing. The array beam steering, and subarray beam smearing combine to both beam steer and beam smear the antenna beam. In so doing, both primary main beams and the intermodulation product beams are reduced in amplitude and broadened in spectral beam width.

Figure 3:
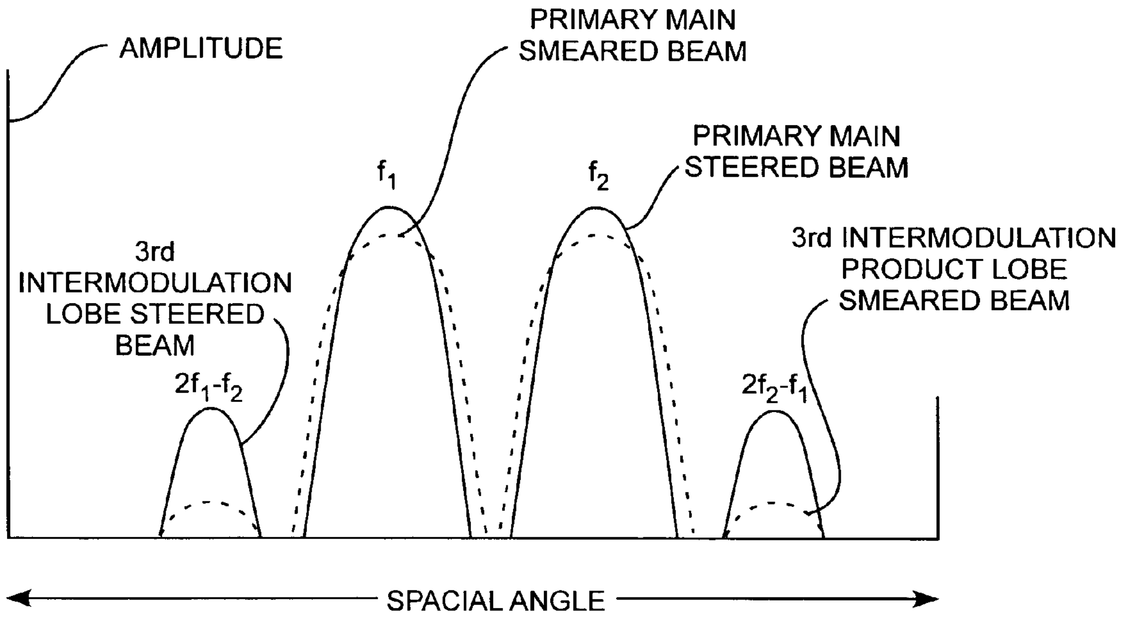
FIG. 3 is a plot of a field of view antenna pattern.

Referring to FIGS. 1, 2, and 3, and more particularly to FIG. 3, the introduction of the angle and phase smearing serves to substantially reduce intermodulation products such as the third-order $2f_1-f_2$ and $2f_2-f_1$ intermodulation products shown as intermodulation lobe steered beams $2f_1-f_2$ and $2f_2-f_1$, respectively, while insignificantly reducing the f1 and f2 primary main beams.

Figure 4A:
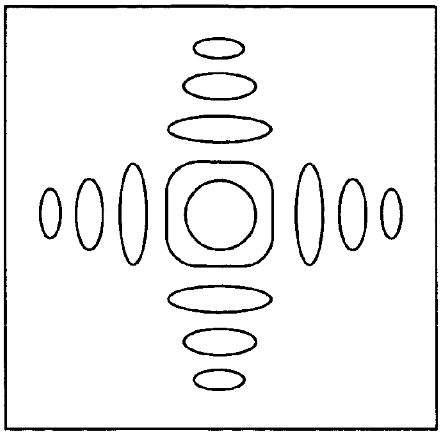
(PRIOR ART) FIG. 4A
FIG. 4A is a graph of the gain of a steered main beam.
Figure 4B:
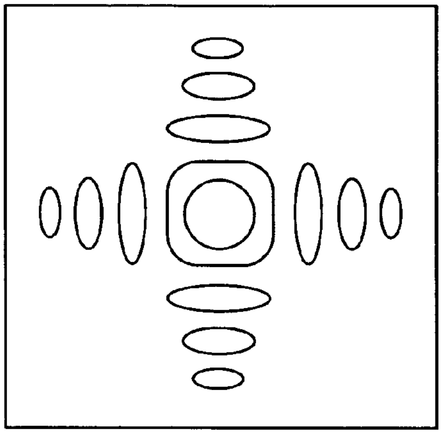
(PRIOR ART) FIG. 4B
FIG. 4B is a graph of the gain of a steered 3rd intermodulation product beam.
Figure 4C:
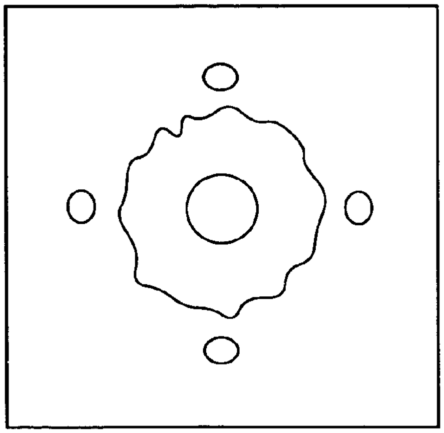
FIG. 4C is a graph of the gain of a phase smeared main beam.
Figure 4D:
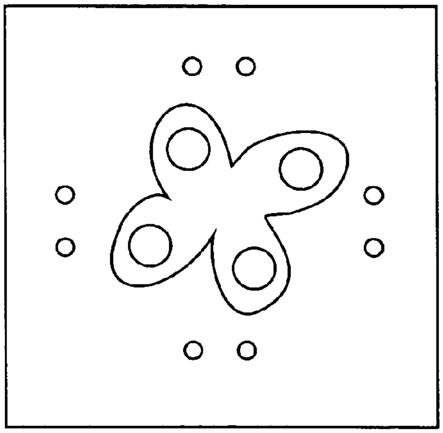
FIG. 4D is a graph of the gain of a phase smeared 3rd intermodulation product.
Figure 4E:
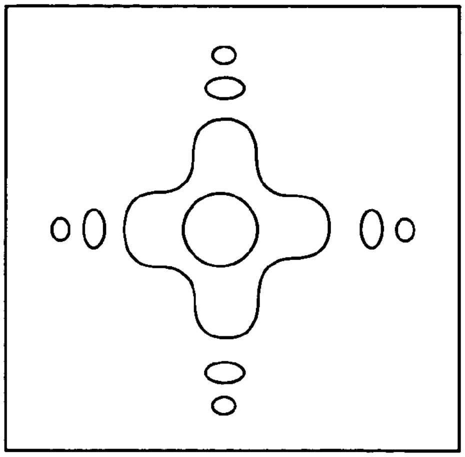
FIG. 4E is a graph of the gain of a beam smeared main beam.
Figure 4F:
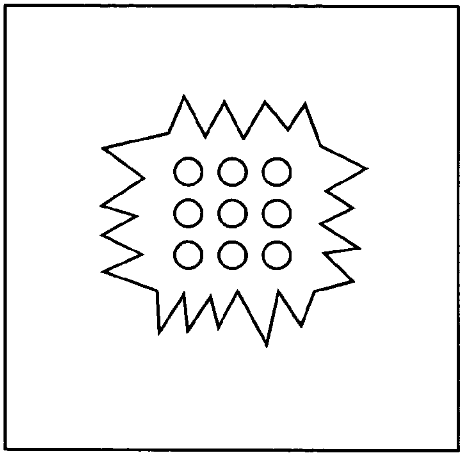
FIG. 4F is a graph of the gain of a beam smeared 3rd intermodulation product beam.
Figure 4G:
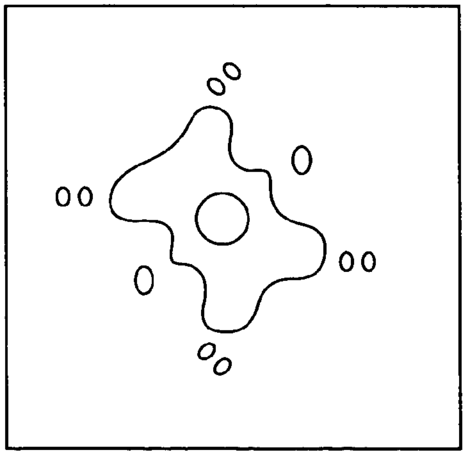
FIG. 4G is a beam smeared and phase smeared main beam.
Figure 4H:
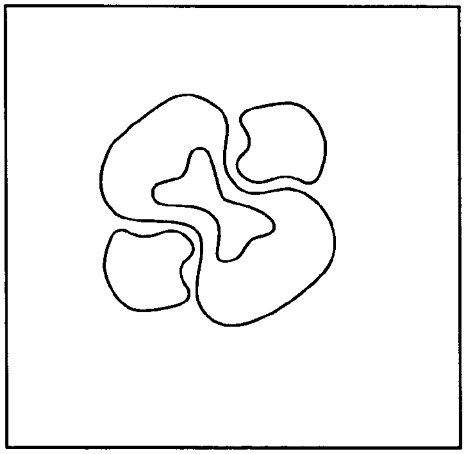
FIG. 4H is a angle smeared and phase smeared 3rd intermodulation product beam.
Figure 4I:
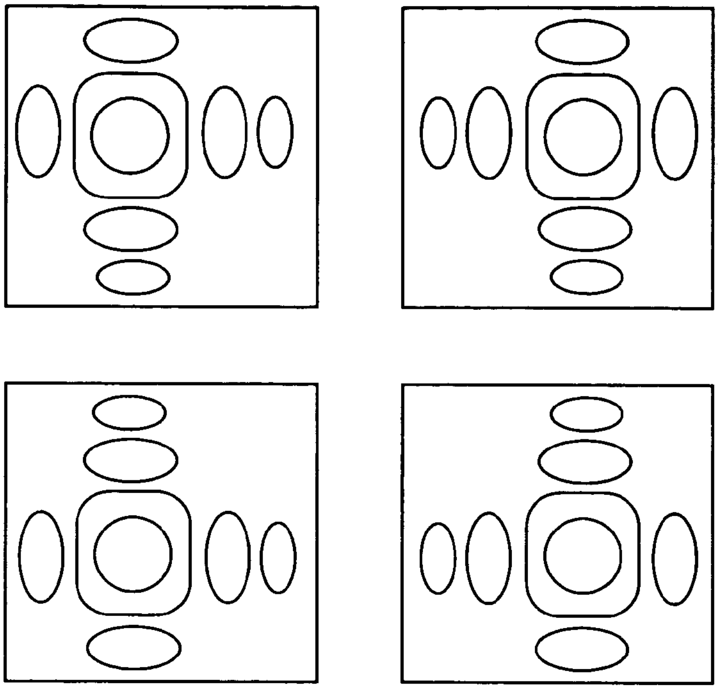
FIG. 4I is a graph of $2f_2-f_1$ quadrant beam smearing.
Figure 4J:
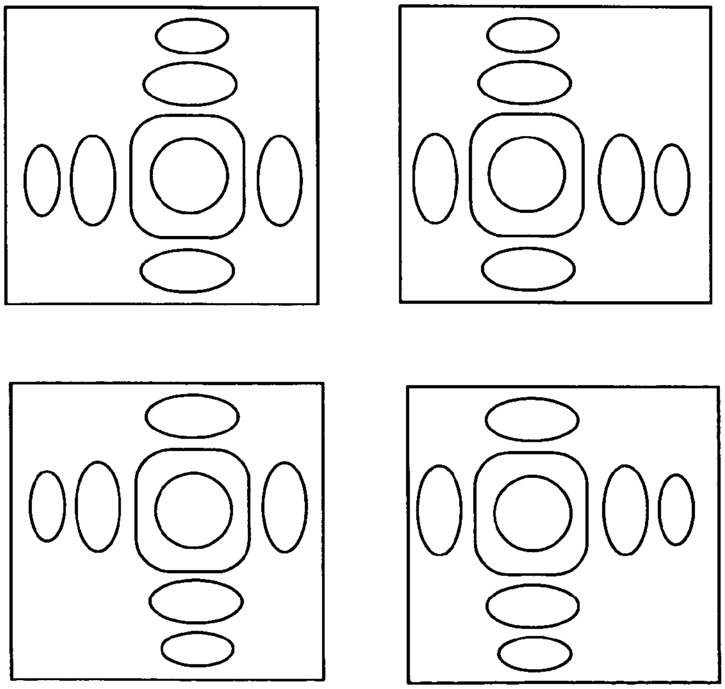
FIG. 4J is a graph of $2f_1-f_2$ quadrant beam smearing.

Referring to FIGS. 4A, 4B, 4C, 4D, 4E, 4F, 4G, 4H, 4I, and 4J, the effects of the angle and phase smearing are shown by way of antenna patterns. In FIGS. 4A and 4B, show contour plots of a conventional unsmeared main beam and a conventional intermodulation product beam that are in symmetrical form as is well known. The main beam is shown by the center circle in each of the FIGS. 4A and 4B. The rounded-square contour around the main beam shows the beam intensity fall off around the main beam. The other oval contours show lower-intensity beams, which are also called sidelobes. FIG. 4C shows the effects of phase smearing on a primary main beam. The center circle denotes the contour of the main beam. The main beam in FIG. 4C is essentially unchanged from the unsmeared case in FIG. 4A. The other contours show lower intensities that are slightly different from the unsmeared case 4A. FIG. 4D shows the effects of phase smearing the intermodulation product beam. The main beam is divided into four parts which are reduced in intensity by approximately a factor of four from the unsmeared case in FIG. 4B. FIG. 4E shows the effects of angle smearing a primary main beam. The main beam in FIG. 4E is essentially unchanged from the unsmeared case in FIG. 4A. The other contours show lower intensities that are slightly different from the unsmeared case 4A. FIG. 4F shows the effects of angle smearing an intermodulation product beam. The main beam is divided into nine parts which are reduced in intensity by approximately a factor of nine from the unsmeared case in FIG. 4B. FIG. 4G shows the effects of angle and phase smearing a primary main beam. The main beam in FIG. 4G is essentially unchanged from the unsmeared case in FIG. 4A. The other contours show lower intensities that are slightly different from the unsmeared case 4A. FIG. 4H shows the effects of angle and phase smearing an intermodulation product beam. The main beam is severely degraded and reduced in intensity compared to the unsmeared case in FIG. 4B. FIG. 4I shows the effects of beam smearing, including both angle and phase smearing, by array quadrant of the $2f_2-f_1$ intermodulation product beam. FIG. 4J shows the effects of beam smearing, including both angle and phase smearing, by array quadrant of the $2f_1-f_2$ intermodulation product beam.

Figure 5:
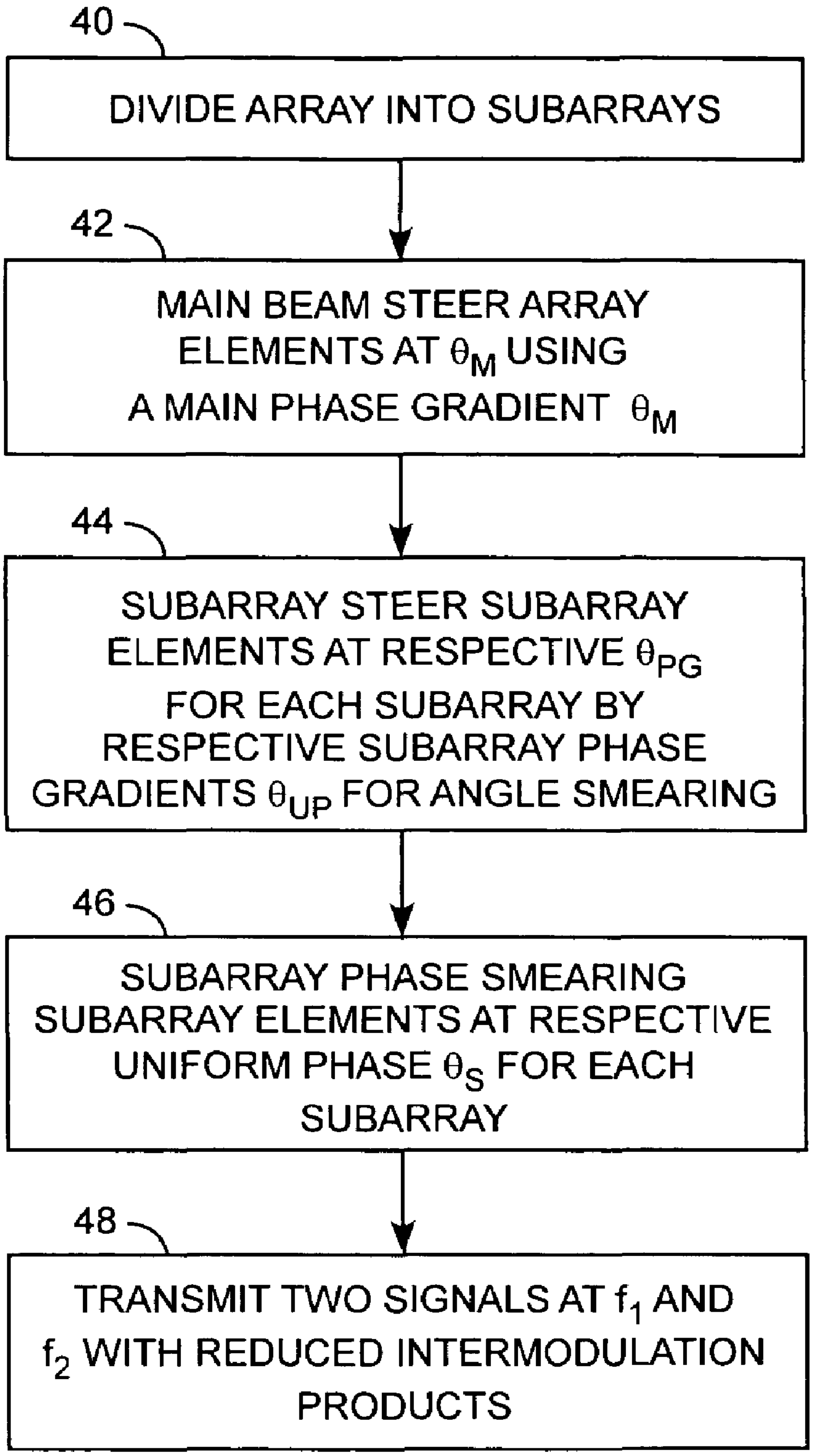
FIG. 5 is a flow chart of a beam smearing process.

Referring to all of the figures, and particularly to FIG. 5, the beam smearing process first divides the array into array subarrays that are preferably of equal size having the same number of antenna elements. As is conventional practice, the primary main beams as well as the intermodulation product beams are steered 42 by providing a phase gradient $\theta_M$ across the entire antenna array by applying the phase gradient to the antenna elements. The phased array beams are angle smeared using respective subarray phase gradients $\theta_{PG}$ that effectively steer the subarray beams. The phased array beams are phased smeared using respective subarray uniform phase $\theta_{UP}$. The two signals at carrier frequencies $f_1$ and $f_2$ are transmitted from the phased array antenna. In phase smearing, adjacent array quadrants have different phase excitations, such as, 0°, +40°, 0°, +40°. The two desired frequencies have opposite phase excitation, such as, 0°, +40°, 0°, +40° for $f_1$, and 0°, −40°, 0°, −40° for $f_2$. While the effect is minimal on the desired frequencies, it is significant on the intermodulation frequencies due to a factor of three magnification. This is the effect of the third order intermodulation on the phase excitation that results in $2\phi_2-\phi_1=3\phi$ or $2\phi_1-\phi_2=3\phi$. In angle smearing, each array quadrant is steered off the main-beam steering angle and in different directions, such as $(\theta_{xo}+\delta,\ \theta_{xo}+\delta)$, $(\theta_{xo}-\delta,\ \theta_{yo}+\delta)$, $(\theta_{xo}-\delta,\ \theta_{yo}-\delta)$, $(\theta_{xo}+\delta,\ \theta_{yo}-\delta)$ as illustrated by the quadrant patterns in FIGS. 4I and 4J. The spatial angle of a desired beam is represented by ($\theta_{xo}$, $\theta_{yo}$) The symbol δ represents a perturbation to the spatial angle that is different for each quadrant. As is shown in FIG. 4I, each subarray beam is steered a small angle 45° away from the center of the array beam, thereby smearing the beam. While the effect is minimal on the desired frequencies, it is significant on the intermodulation frequencies due to a factor of three magnification. This is the effect of the third order intermodulation on the phase excitation that results in 3δ perturbation to the intermodulation product subarray beams. The resulting desired and intermodulation patterns are shown in FIGS. 4C and 4D. As in phase smearing, the desired frequencies are steered oppositely for $f_1$ and $f_2$. Again, as in phase smearing, the results of angle smearing are magnified by approximately a factor of three in the intermodulation beams.

The beam smearing method reduces the level of intermodulation product beams. The method is for use in arrays having multiple signals. Active transmit phased arrays typically have one beam. In practice, the system can be changed by a beamformer design to accommodate two or more beams at respective frequencies. However, as a practical matter, more design modifications are necessary to produce two or more beams with an active transmit phased array.

The beam smearing method is independent of the power amplifier or solid-state power amplifiers. The beam smearing method reduces third-order intermodulation products but with minor degradation of the desired main beams that can be used with existing phased array antenna having a beam smearing system. The beam smearing method suppresses all intermodulation product beams. That is, the method offers significantly greater suppression of intermodulation products at the cost of a minor degradation of the desired main beam patterns. The main beam spoiling degrades the desired beams a small amount and suppresses the intermodulation product beams significantly. For reference, contour plots of unspoiled desired and intermodulation patterns are shown in FIG. 4A through 4J. In phase smearing, adjacent subarrays have different phase excitations, such as 0°, +40°, 0°, +40°. The two desired frequencies have opposite phase excitation, such as 0°, +40°, 0°, +40° at f1 and 0°, −40°, 0°, −40° at f2. The resulting desired and intermodulation beams are both effected, but with differing amounts. The effect of the third order intermodulation on the phase excitation results in $2\phi_2-\phi_1=3\phi$ or $2\phi_{1-\phi 2}=3\phi$.

In angle smearing, each array subarray is steered off the main-beam steering angle and in different directions, such as ($\theta_{xo}+\delta$, $\theta_{yo}+\delta$), ($\theta_{xo}-\delta$, $\theta_{yo}+\delta$), ($\theta_{xo}-\delta$, $\theta_{yo}-\delta$), and ($\theta_{xo}+\delta$, $\theta_{yo}-\delta$) as illustrated by the quadrant patterns. The spatial angle of a desired beam is represented by ($\theta_{xo}$, $\theta_{yo}$). The symbol δ represents a perturbation to the spatial angle that is different for each quadrant. As is shown in FIG. 4I, each subarray beam is steered a small angle +45° away from the center of the array beam, thereby smearing the beam. The resulting desired and intermodulation patterns can be calculated, simulated, and plotted. As in phase smearing, the desired frequencies are steered oppositely for $f_1$ and $f_2$. Again, as in phase smearing, the results of angle smearing are magnified by approximately a factor of three in the intermodulation beam. The desired and intermodulation patterns that result from a combination of both angle and phase smearing can be plotted for comparison as shown in FIGS. 4A through 4J. The desired pattern spot beam changes insignificantly while the intermodulation pattern beam spreads out and is significantly reduced in level. In order to assess the effectiveness of beam spoiling, a computed series of patterns for an exemplar array can be used. The exemplar array can be a 14×14 square array of 2.5-wavelength elements, with uniform amplitude excitation. Each element has a $J_1(u)/u$ element pattern. Patterns can be calculated for smear phases ranging from 0 to 55 degrees and smear angles ranging from 0 to 1 degrees. In order to show that the effectiveness of the method is independent of the two frequencies and independent of the desired beam angles, the calculations can be made with practically identical frequencies and beam steering angles right on top of each other. Two performance metrics were selected. The first performance metric is the degradation of the spot beam at the desired frequency as measured by the lowest level inside the beam, having for example, spot sizes of 1.0° and 1.5°. The second performance metric is the suppression of the intermodulation product beam as measured by the highest intermodulation level in the field of view, such as for an earth field of view as viewed from geosynchronous orbit or ±8 degrees. The performance was approximately 1 dB of degradation within the 1.0° and 1.5° spots with no spoiling, with phase smearing only, with angle smearing only, and by beam smearing including both angle and phase smearing. The resulting suppression is between 6 dB and 10 dB with the angle smearing having the greatest suppression. The invention is applicable to any sized phased array antenna system communicating a plurality of signals at respective carriers frequencies. Those skilled in the art can make enhancements, improvements, and modifications to the invention, and these enhancements, improvements, and modifications may nonetheless fall within the spirit and scope of the following claims.

What is claimed is:

1. A method for beam smearing an antenna beam communicating signals at respective carrier frequencies, the signals communicated through antenna elements of a phased array antenna, the method comprising the steps of, dividing the phased array antenna into subarray comprising respective array elements each being portions of the antenna elements, steering the antenna beam in a direction by equal phase shifting the carrier frequencies for the antenna elements, phase smearing the antenna beam by respective uniform phase shifts of the carrier frequencies for the respective subarray elements, and angle smearing the antenna beam by respective gradient phase shifts of the carrier frequencies for the respective subarray elements.

2. The method of claim 1 wherein, the antenna beam comprises a plurality of primary main beams and a plurality of intermodulation products beams.

3. The method of claim 1 wherein, the antenna beam comprises two primary main beams and comprises two intermodulation products beams, the signals are two signals, and the carrier frequencies are two carrier frequencies respectively modulated by the two signals.

4. The method of claim 1 wherein, the antenna beam comprises two primary main beams and comprises two intermodulation products beams, the signals are two signals, and the carrier frequencies are two carrier frequencies respectively modulated by the two signals.

5. The method of claim 1 wherein, the antenna beam comprises two primary main beams and comprises two intermodulation products beams, the signals are two signals, and the carrier frequencies are two carrier frequencies respectively modulated by the two signals, and the method serving to reduce amplitudes of the intermodulation product beams.

6. The method of claim 1 wherein, the antenna beam comprises two primary main beams and comprises two intermodulation products beams, the signals are two signals, the carrier frequencies are two carrier frequencies respectively modulated by the two signals, and the method reduces amplitudes of the two intermodulation product beams.

7. The method of claim 1 wherein, each subarray has an equal number of antenna elements.

8. The method of claim 1 wherein, the subarrays provide respective subarray beams, and the respective subarray beams combine to form the antenna beam.

9. The method of claim 1 wherein, total phase shifts of the carrier frequencies communicated through the respective antenna elements comprise a gradient phase shift for antenna beam steering and comprise an gradient phase shift for subarray beam steering and comprise gradient phase shift for subarray beam smearing, the subarray beam steering and subarray beam smearing combine to beam smear the antenna beam.

10. The method of claim 1 wherein, the subarrays are four subarrays.

11. A method for beam smearing an antenna beam communicating two signals respectively at two carrier frequencies, the two signals communicated through antenna elements of a phased array antenna, the antenna beam comprising two primary main beams and two intermodulation product beams in a field of view of the phased array antenna, the method for reducing amplitudes of two intermodulation product beams in the field of view of the phased array antenna, the method comprising the steps of, dividing the phased array antenna into subarrays each comprising an equal number of subarray elements, steering the antenna beam in a direction by equal phase shifting the carrier frequencies for the antenna elements, phase smearing the antenna beam by respective uniform phase shifts of the carrier frequencies for the respective subarray elements, and angle smearing the antenna beam by respective gradient phase shifts of the carrier frequencies for the respective subarray elements, the angular smearing and phase smearing serving to reduce the amplitudes of the intermodulation products.

12. The method of claim 10 wherein, the angular smearing and phase smearing serving to reduce the amplitudes and to broaden spatial widths of the intermodulation products beams.

* * * * *